United States Patent
Yi et al.

(10) Patent No.: US 11,385,459 B2
(45) Date of Patent: *Jul. 12, 2022

(54) HEAD MOUNTED DISPLAY DEVICE WITH LENS AND DISPLAY THAT MINIMIZE LENS REFLECTED VIRTUAL IMAGE PERCEPTION

(71) Applicant: Samsung Display Co., Ltd., Yongin-si (KR)

(72) Inventors: Min Seong Yi, Hwaseong-si (KR); Jae Wook Kang, Hwaseong-si (KR); Il Hun Seo, Asan-si (KR); Yun Mo Chung, Yongin-si (KR); Mi Yeon Cho, Seoul (KR)

(73) Assignee: SAMSUNG DISPLAY CO. LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/012,509

(22) Filed: Sep. 4, 2020

(65) Prior Publication Data

US 2020/0400942 A1 Dec. 24, 2020

Related U.S. Application Data

(62) Division of application No. 15/982,789, filed on May 17, 2018, now Pat. No. 10,795,153.

(30) Foreign Application Priority Data

Jun. 22, 2017 (KR) ........................ 10-2017-0079117

(51) Int. Cl.
*G02B 27/00* (2006.01)
*G02B 27/01* (2006.01)
*G09G 3/00* (2006.01)

(52) U.S. Cl.
CPC ..... *G02B 27/0018* (2013.01); *G02B 27/0172* (2013.01); *G09G 3/003* (2013.01);
(Continued)

(58) Field of Classification Search
CPC ............ G02B 27/0018; G02B 27/0172; G02B 27/017; G02B 2027/0132; G02B 2027/012; G02B 2027/0178; G02B 2027/0121
See application file for complete search history.

(56) References Cited

U.S. PATENT DOCUMENTS 5,436,765 A 7/1995 Togino
7,637,617 B2 12/2009 Liu et al.
(Continued)

FOREIGN PATENT DOCUMENTS

EP 3024221 5/2016
JP H063641 1/1994
(Continued)

OTHER PUBLICATIONS

European Search Report—European Application No. 18178940.5 dated November 6, 2018, citing references listed within.
(Continued)

*Primary Examiner* — Liliana Cerullo
(74) *Attorney, Agent, or Firm* — Cantor Colburn LLP

(57) ABSTRACT

A head mounted display device is provided. The head mounted display device includes a left eye display unit which displays an image for a left eye and is disposed along a trajectory of a left eye ellipse having a first eccentricity, and a left eye lens which faces the left eye display unit and refracts the image for the left eye in a direction of a user's left eye.

10 Claims, 17 Drawing Sheets

(52) U.S. Cl.
CPC .......... *G02B 2027/012* (2013.01); *G02B 2027/0121* (2013.01); *G02B 2027/0132* (2013.01); *G02B 2027/0178* (2013.01)

(56) References Cited

U.S. PATENT DOCUMENTS

| | | |
|---|---|---|
| 9,316,834 B2 | 4/2016 | Makino et al. |
| 2007/0285793 A1 | 12/2007 | Liu et al. |
| 2009/0122385 A1 | 5/2009 | Hilton |
| 2010/0079861 A1* | 4/2010 | Powell .......... H04N 9/3129 359/449 |
| 2012/0026071 A1 | 2/2012 | Hamdani et al. |
| 2014/0002587 A1 | 1/2014 | Aguren |
| 2015/0036077 A1 | 2/2015 | Lee et al. |
| 2016/0077336 A1 | 3/2016 | Hainich |
| 2016/0377869 A1 | 12/2016 | Lee et al. |
| 2017/0115489 A1 | 4/2017 | Hu et al. |
| 2017/0219826 A1 | 8/2017 | Haseltine et al. |

FOREIGN PATENT DOCUMENTS

| | | |
|---|---|---|
| JP | 2016148839 | 8/2016 |
| KR | 1020160068060 | 6/2016 |
| WO | 2005078510 | 8/2005 |
| WO | 2014167934 | 10/2014 |
| WO | 2016209941 | 12/2016 |

OTHER PUBLICATIONS

Chinese Office Action—Chinese Application No. 201810641899.3 dated May 31, 2021, citing references listed within.
Japanese Office Action—Japan Applicatin No. 2016-118659 dated Mar. 1, 2022, citing references listed within.

* cited by examiner

HEAD MOUNTED DISPLAY DEVICE WITH LENS AND DISPLAY THAT MINIMIZE LENS REFLECTED VIRTUAL IMAGE PERCEPTION

This application is a divisional of U.S. patent application Ser. No. 15/982,789, filed on May 17, 2018, which claims priority to Korean Patent Application No. 10-2017-0079117, filed on Jun. 22, 2017, and all the benefits accruing therefrom under 35 U.S.C. § 119, the content of which in its entirety is herein incorporated by reference.

BACKGROUND

1. Field

Exemplary embodiments of the invention relate to a head mounted display device.

2. Description of the Related Art

A head mounted display ("HMD") device, which is mounted on a head to display an image to a user, has recently attracted a considerable attention as a visualization device for providing a virtual reality or an augmented reality.

A head mounted display device generally includes a display plate for displaying an image and a lens disposed between the display plate and a user's eyeball to magnify an image and refract the magnified image to the user's eyeball.

SUMMARY

A head mounted display device, unlike a conventional display device, is problematic in that a user recognizes a virtual image due to a lens disposed between a display plate and user's eye. Such a virtual image, which is recognized by allowing light reflected by the lens to be incident on the user's eye again to be recognized by the user, has caused a problem of deteriorating a display quality of the head mounted display device.

Accordingly, in order to solve the above problem, exemplary embodiments of the invention provide a head mounted display device, which may minimize the phenomenon of a virtual image caused by the reflected light due to a lens being recognized by a user.

According to an exemplary embodiment of the invention, there is provided a head mounted display device. The display device includes a left eye display unit which displays an image for a left eye and is disposed along a trajectory of a left eye ellipse having a first eccentricity, and a left eye lens facing the left eye display unit and which refracts the image for the left eye in a direction of a user's left eye.

According to another exemplary embodiment of the invention, there is provided a head mounted display device. The display device includes a display unit including a first portion which displays an image for a left eye and is disposed along a trajectory of a left eye ellipse having a first eccentricity, a second portion which displays an image for a right eye and is disposed along a trajectory of a right eye ellipse having a second eccentricity, and a third portion between the first portion and the second portion, a left eye lens which faces the first portion and refracts the image for the left eye in a direction of a user's left eye, and a right eye lens which faces the second portion and refracts the image for the right eye in a direction of a user's right eye.

According to another exemplary embodiment of the invention, there is provided a head mounted display device. The display device includes a left eye display unit which displays an image for a left eye and is disposed along a trajectory of a left eye ellipse having a first eccentricity, a right eye display unit which displays an image for a right eye and is disposed along a trajectory of a right eye ellipse having a first eccentricity, a left eye lens which faces the left eye display unit and refracts the image for the left eye in a direction of a user's left eye, and a right eye lens which faces the right eye display unit and refracts the image for the right eye in a direction of a user's right eye, where the left eye ellipse defines a first left eye focus and a second left eye focus disposed away from the user's right eye than the first left eye focus, the right eye ellipse defines a first right eye focus and a second right eye focus disposed away from the user's left eye than the first right eye focus, the left eye lens overlaps the first left eye focus on a plane on which the left eye ellipse is disposed, and the right eye lens overlaps the first right eye focus on a plane on which the right eye ellipse is disposed.

However, exemplary embodiments of the invention are not restricted to the exemplary embodiments set forth herein. The above and other exemplary embodiments of the invention will become more apparent to one of ordinary skill in the art to which the invention pertains by referencing the detailed description of the invention given below.

BRIEF DESCRIPTION OF THE DRAWINGS

The above and other exemplary embodiments, advantages and features of the invention will become more apparent by describing in detail exemplary embodiments thereof with reference to the attached drawings, in which.

DETAILED DESCRIPTION

Figure 1A:
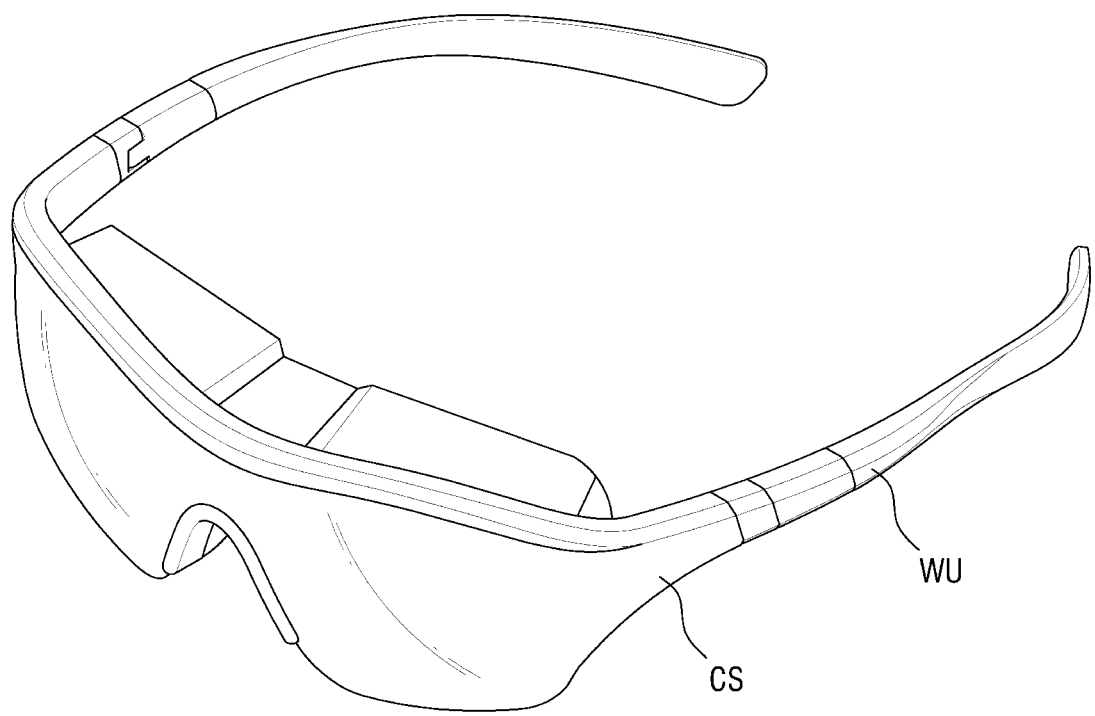
FIGS. 1A and 1B are perspective views showing an exemplary embodiment of a head mounted display device according to the invention.

The invention will now be described more fully hereinafter with reference to the accompanying drawings, in which preferred embodiments of the invention are shown. This invention may, however, be embodied in different forms and should not be construed as limited to the exemplary embodiments set forth herein. Rather, these embodiments are provided so that this disclosure will be thorough and complete, and will fully convey the scope of the invention to those skilled in the art. The same reference numbers indicate the same components throughout the specification. In the attached drawing figures, the thickness of layers and regions is exaggerated for clarity.

It will be understood that, although the terms first, second, third, etc., may be used herein to describe various elements, these elements should not be limited by these terms. These terms are only used to distinguish one element from another element. Thus, a first element discussed below could be termed a second element without departing from the teachings of the invention.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the drawing figures. It will be understood that the spatially relative terms are intended to encompass different orientations of the device in use or operation in addition to the orientation depicted in the drawing figures. For example, if the device in the drawing figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

In the invention, an electronic apparatus may be any apparatus provided with a display device. Examples of the electronic apparatus may include smart phones, mobile phones, navigators, game machines, TVs, car head units, notebook computers, laptop computers, tablet computers, personal media players ("PMPs"), and personal digital assistants ("PDAs"). The electronic apparatus may be embodied as a pocket-sized portable communication terminal having a wireless communication function. Further, the display device may be a flexible display device capable of changing its shape.

Hereinafter, embodiments of the invention will be described with reference to the attached drawings.

Figure 1B:
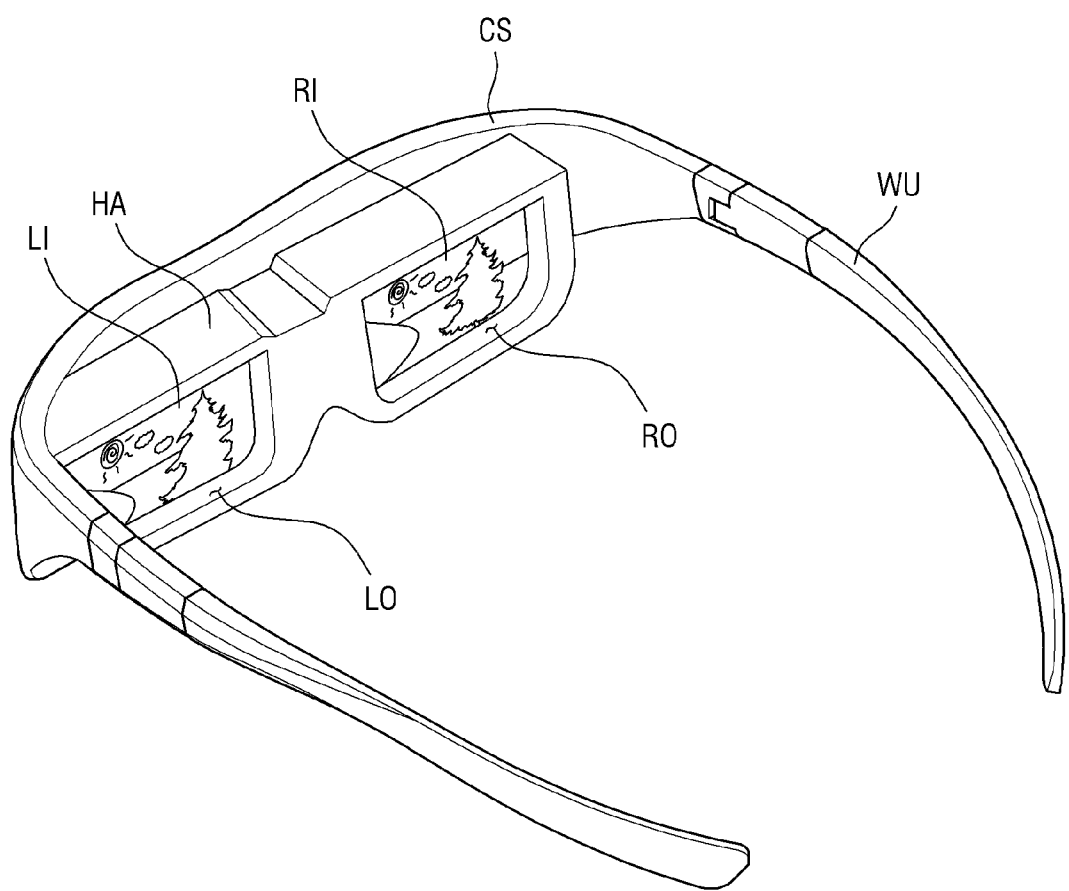

FIGS. 1A and 1B are perspective views showing a head mounted display device according to an exemplary embodiment of the invention.

As shown in FIGS. 1A and 1B, the head mounted display device according to an exemplary embodiment of the invention is mounted on a user's head to display an image LI for a left eye and an image RI for a right eye to user's eyes, respectively, and includes a case CS and a wearing unit WU connected to the case CS.

The case CS may be worn on at least a part (for example, facial side) of a user's face, and may be supported to a facial side of a user by various components. The inside of the case CS may accommodate and support a left eye display unit LD, a right eye display unit RD, a left eye lens LLS (refer to FIG. 2), and a right eye lens RLS (refer to FIG. 2), which will be described later. The case CS may be formed in any shape as long as the case CS may be mounted on the user's head while supporting the left eye display unit LD, the right eye display unit RD, the left eye lens LLS, and the right eye lens RLS. In an exemplary embodiment, the case CS may have various shapes, and, for example, may have an eyeglass shape or a helmet shape.

A housing HA is provided with a left eye opening LO through which an image LI for a left eye is displayed and a right eye opening RO through which an image RI for a right eye is displayed. The image displayed on the left eye display unit LD may be recognized by a user's left eye LE through the left eye opening LO via the left eye lens LLS, and the image displayed on the right eye display unit RD may be recognized by a user's right eye RE through the right eye opening RO via the right eye lens RLS. In an exemplary embodiment, when the left eye lens LLS and the right eye lens RLS are directly exposed to the outside of the case CS, the left eye opening LO and the right eye opening RO may be formed in a very thin width or may be omitted. In an exemplary embodiment, another opening (not shown) may be further provided in addition to the left eye opening LO and the right eye opening RO. Through the another opening, the surrounding background may be visually checked at the same time in addition to the displayed image when the left eye display unit LD and the right eye display unit RD are transparent display units. This opening may be utilized to use an augmented reality or virtual reality technology.

Although not shown specifically, the image LI for a left eye, shown in this drawing, may be an image having passed through the left eye lens LLS, and the image RI for a right eye, shown in this drawing, may be an image having passed through the right eye lens RLS.

The wearing unit WU fixes the case CS to a user's head. The wearing unit WU may include any shape or any material as long as the case CS may be fixed to the user's head. In an exemplary embodiment, when the head mounted display device has an eyeglass shape, the wearing unit WU may have a leg shape of an eyeglass as shown in FIGS. 1A and 1B. In an exemplary embodiment, the wearing unit WU may have a band shape surrounding the user's head.

Figure 2:
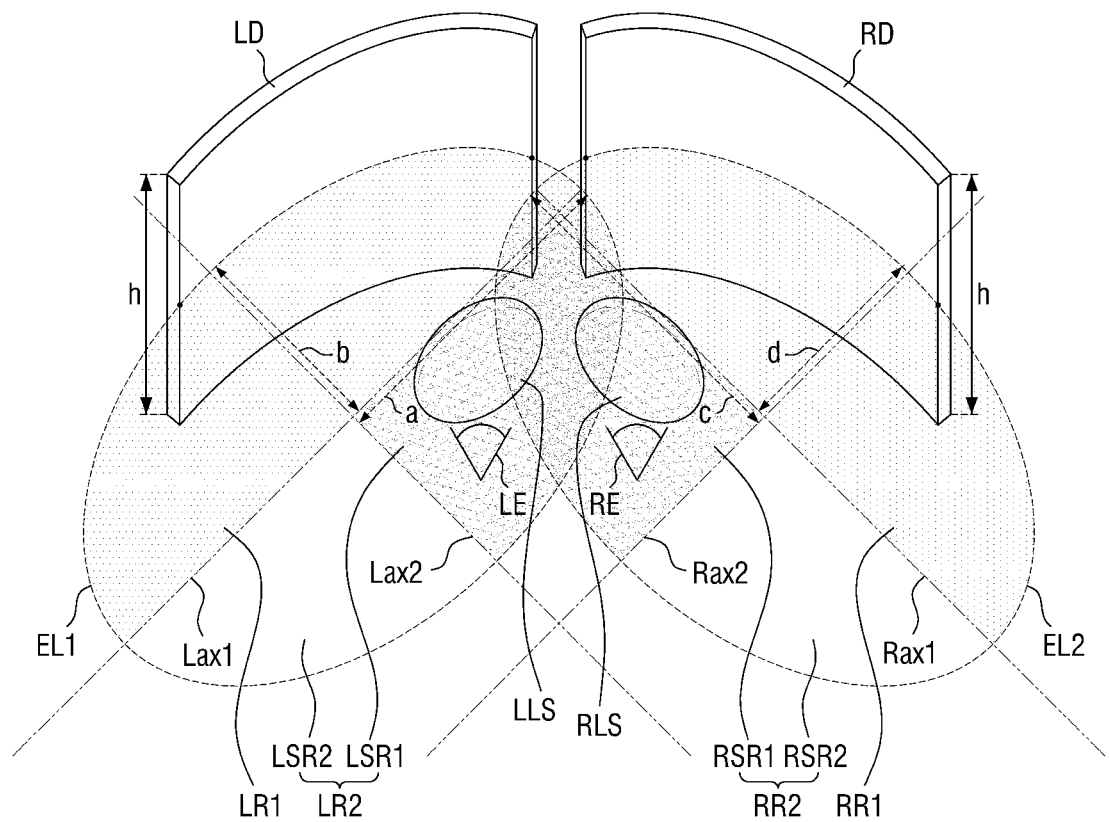
FIG. 2 is a schematic view showing a part of a configuration of the head mounted display device shown in FIG. 1.
Figure 3:
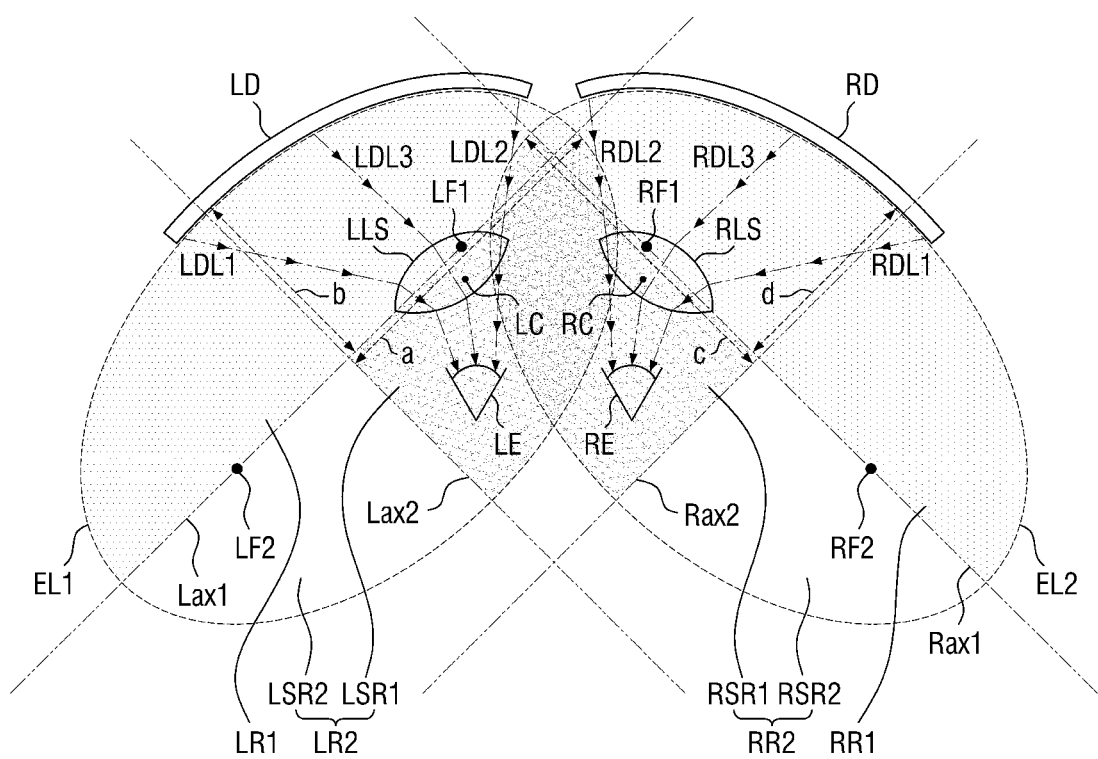
FIG. 3 is a sectional view of the head mounted display device shown in FIG. 2 taken along the plane on which a left eye ellipse and a right eye ellipse are disposed.

FIG. 2 is a schematic view showing a part of a configuration of the head mounted display device shown in FIGS. 1A and 1B, and FIG. 3 is a sectional view of the head mounted display device shown in FIG. 2 taken along the plane on which a left eye ellipse and a right eye ellipse are disposed.

The left eye ellipse EL1 and the right eye ellipse EL2 are disposed on the same plane, and may be the same as each other in length of major axis, length of minor axis, and eccentricity. The left eye ellipse EL1 and the right eye ellipse EL2 are not physically real components, but may be virtual ellipses that define the relative positional relationship of the respective components disposed inside the housing HA. The left eye ellipse EL1 may be defined by Equation (1) below with respect to a coordinate plane having a major axis as the x axis, a minor axis as the y axis, and a center point as the origin.

$$\frac{x^2}{a^2} + \frac{y^2}{b^2} = 1 \qquad \text{Equation (1)}$$

Here, a may be a major radius of the left eye ellipse EL1, and b may be a minor radius of the left eye ellipse EL1. The major radius may be a half of the major axis (that is, long diameter) of an ellipse, and the minor radius may be a half of the minor axis (that is, short diameter) of an ellipse.

The first eccentricity e1, which is an eccentricity of the left eye ellipse EL1, may be defined by Equation (2) below.

$$e1 = \frac{\sqrt{a^2 - b^2}}{a} = \sqrt{1 - \frac{b^2}{a^2}} \qquad \text{Equation (2)}$$

The eccentricity is a value indicating the degree of distortion of the ellipse. As the eccentricity is closer to 0, the ellipse is closer to a circle. As the eccentricity is closer to 1, the ellipse has a more seriously distorted shape (that is, shape having a short minor radius).

Similarly, the right eye ellipse EL2 may be defined by Equation (3) below with respect to a coordinate plane having a major axis as the x axis, a minor axis as the y axis, and a center point as the origin.

$$\frac{x^2}{c^2} + \frac{y^2}{d^2} = 1 \qquad \text{Equation (3)}$$

Here, c may be a major radius of the right eye ellipse EL2, and d may be a minor radius of the right eye ellipse EL2.

The second eccentricity e2, which is an eccentricity of the right eye ellipse EL2, may be defined by Equation (4) below.

$$e2 = \frac{\sqrt{c^2 - d^2}}{c} = \sqrt{1 - \frac{d^2}{c^2}} \qquad \text{Equation (4)}$$

Here, the major radius a of the left eye ellipse EL1 may have the same value as the major radius c of the right eye ellipse EL2. Further, the minor radius b of the left eye ellipse EL1 may have the same value as the minor radius d of the right eye ellipse EL2. In this case, the eccentricity e1 of the left eye ellipse EL1 and the eccentricity e2 of the right eye ellipse EL2 may have the same value as each other. In other words, the left eye ellipse EL1 and the right eye ellipse EL2 may be ellipses having the same shape as each other. In this exemplary embodiment, a configuration in which the left eye ellipse EL1 and the right eye ellipse EL2 have the same shape is illustrated, but, in another exemplary embodiment, the left eye ellipse EL1 and the right eye ellipse EL2 may have different sizes and may have different eccentricities.

The left eye ellipse EL1 may have two focuses. Here, the focus disposed close to the user's right eye RE is referred to as a first left eye focus LF1, and the other focus is referred to as a second left eye focus LF2. In other words, the focus disposed away from the user's right eye RE is referred to as a second left eye focus LF2, and the other focus is referred to as a first left eye focus LF1. Similarly, the right eye ellipse EL2 may have two focuses. Here, the focus disposed close to the user's left eye LE is referred to as a first right eye focus RF1, and the other focus is referred to as a second right eye focus RF2. In other words, the focus disposed away from the user's left eye LE is referred to as a second right eye focus RF2, and the other focus is referred to as a first right eye focus RF1. In this case, the major axis Lax1 of the left eye ellipse may pass through the first left eye focus LF1 and the second left eye focus LF2, and the major axis Rax1 of the right eye ellipse may pass through the first right eye focus RF1 and the second right eye focus RF2. Further, the short axis Lax2 of the left eye ellipse may pass through the center point of the left eye ellipse EL1, and may be orthogonal to the major axis Lax1 of the left eye ellipse. Similarly, the short axis Rax2 of the right eye ellipse may pass through the center point of the right eye ellipse EL2, and may be orthogonal to the long axis Rax1 of the right eye ellipse.

The left eye ellipse EL1 may be divided into two regions. Specifically, the left eye ellipse EL1 may be divided into two regions by the major axis Lax1 of the left eye ellipse. In this case, the region located in the direction in which the left eye display unit LD is disposed may be defined as a first left eye ellipse region LR1, and the other region may be defined as a second left eye ellipse region LR2. Similarly, the right eye ellipse EL2 may be divided into two regions. Specifically, the right eye ellipse EL2 may be divided into two regions by the major axis Rax1 of the right eye ellipse. In this case, the region located in the direction in which the right eye display unit RD is disposed may be defined as a first right eye ellipse region RR1, and the other region may be defined as a second right eye ellipse region RR2.

Moreover, the second left eye ellipse region LR2 may be divided into two regions. Specifically, the second left eye ellipse region LR2 may be divided into two regions by the minor axis Lax2 of the left eye ellipse. In this case, the region disposed close to the left eye display unit LD may be defined as a first sub left eye ellipse region LSR1, and the other region may be defined as a second sub left eye ellipse region LSR2.

Similarly, the second right eye ellipse region RR2 may be divided into two regions. Specifically, the second right eye ellipse region RR2 may be divided into two regions by the minor axis Rax2 of the right eye ellipse. In this case, the region disposed close to the right eye display unit RD may be defined as a first sub right eye ellipse region RSR1, and the other region may be defined as a second sub right eye ellipse region RSR2.

Here, the first sub left eye ellipse region LSR1 and the first sub right eye ellipse region RSR1 may be disposed adjacent to each other. In other words, the first sub right eye ellipse region RSR1 may be disposed closer to the first sub left eye ellipse region LSR1 than the second sub right eye ellipse region RSR2, and the first sub left eye ellipse region LSR1 may be disposed closer to the first sub right eye ellipse region RSR1 than the second sub left eye ellipse region LSR2.

The left eye ellipse EL1 and the right eye ellipse EL2 may be disposed so as to partially overlap each other. However, the invention is not limited thereto, and, in an exemplary embodiment, the left eye ellipse EL1 and the right eye ellipse EL2 may be disposed to be spaced apart from each other.

The left eye ellipse EL1 and the right eye ellipse EL2 may be disposed to obliquely intersect each other. In other words, the major axis Lax1 of the left eye ellipse and the major axis Rax1 of the right eye ellipse may be disposed so as to intersect each other to form a predetermined angle therebetween.

Hereinafter, a head mounted display device according to an exemplary embodiment of the invention will be described.

Referring to FIGS. 2 and 3, the head mounted display device according to an exemplary embodiment of the invention may include a left eye display unit LD, a right eye display unit RD, a left eye lens LLS, and a right eye lens RLS.

Each of the left eye display unit LD and the right eye display unit RD includes a plurality of pixels (not shown). Here, the pixel may mean a minimum unit for displaying a color. Each of the left eye display unit LD and the right eye display unit RD may include an organic light-emitting diode ("OLED") (not shown), and may further include at least one scan wiring (not shown) for causing the an OLED to emit light, at least one data line (not shown), a plurality of thin film transistors (not shown), and at least one capacitor (not shown). However, the left eye display unit LD and the right eye display unit RD may not be limited to being composed of organic light emitting diodes. In some exemplary embodiments, examples of the left eye display unit LD and the right eye display unit RD may include various display devices, such as liquid crystal displays ("LCDs"), plasma displays ("PDs"), field emission displays ("FEDs"), electrophoretic displays ("EPDs"), and electrowetting displays ("EWDs").

The left eye display unit LD and the right eye display unit RD may be composed of different panels from each other. However, the invention is not limited thereto, and, in some exemplary embodiments, the left eye display unit LD and the right eye display unit RD may be composed of the same panel.

The left eye display unit LD is disposed along the trajectory of the left eye ellipse ELL and the right eye display unit RD is disposed along the trajectory of the right eye ellipse EL2. Here, the meaning that the left eye display unit LD is disposed along the trajectory of the left eye ellipse EL1 means that when a reflecting surface capable of reflecting the light provided to the left eye display unit LD is cut along the plane on which the left eye ellipse EL1 is disposed, the reflecting surface is disposed to be in contact with the left eye ellipse ELL and has a shape bent to have an eccentricity equal to the first eccentricity e1. This configuration may be applied to the right eye display unit RD, and the right eye display unit RD may have a curved shape so as to have the second eccentricity e2.

Moreover, the left eye display unit LD may have a shape extending in a direction perpendicular to the plane on which the left eye ellipse EL1 is disposed. That is, the left eye display unit LD may have a shape in which a part of the elliptical column defined by the left eye ellipse EL1 is removed. Similarly, the right eye display unit RD may have a shape extending in a direction perpendicular to the plane on which the right eye ellipse EL2 is disposed. In other words, the right eye display unit RD may have a shape in which a part of the elliptical column defined by the right eye ellipse EL2 is removed. Each of the left eye display unit LD and the right eye display unit RD may have a height h. Here, the height of each of the left eye display unit LD and the right eye display unit RD may be referred to as a length extending in a direction perpendicular to the plane on which each of the left eye ellipse EL1 and the right eye ellipse EL2. The left eye display unit LD may be bisected by the left eye ellipse EL1. In other words, the left eye display unit LD may extend by h/2 along a direction perpendicular to the plane on which the left eye ellipse EL1 is disposed and a direction opposite to the plane with respect to the plane. Similarly, the right eye display unit RD may be bisected by the right eye ellipse EL2. In other words, the right eye display unit RD may extend by h/2 along a direction perpendicular to the plane on which the right eye ellipse EL2 is disposed and a direction opposite to the plane with respect to the plane. However, the invention is not limited thereto, and the left eye display unit LD may not be bisected by the left eye ellipse EL1, and the right eye display RD may not be bisected by the right eye ellipse EL2.

In order to prevent the left eye display unit LD from having an excessively curved structure, the left eye display unit LD may be disposed not to overlap the major axis Lax1 of the left eye ellipse. In other words, the left eye display unit LD may be disposed to be spaced apart from the major axis Lax1 of the left eye ellipse. In order to prevent the right eye display unit RD from having an excessively curved structure, the right eye display unit RD may be disposed not to overlap the major axis Rax1 of the right eye ellipse. In other words, the right eye display unit RD may be disposed to be spaced apart from the major axis Rax1 of the right eye ellipse.

The left eye lens LLS faces the left eye display unit LD, and magnifies an image LI (refer to FIG. 1B) for a left eye, displayed by the left eye display unit LD, and refracts the magnified image in the direction of the user's left eye LE. The front surface of the left eye lens LLS may have a convex shape toward the left eye display unit LD. However, the invention is not limited thereto, and the front surface of the left eye lens LLS may have a concave shape or a planar shape. Here, among both surfaces of the left eye lens LLS, the front surface of the left eye lens LLS may be one surface disposed in the direction toward the left eye display unit LD, and the rear surface of the left eye lens LLS may be one surface disposed in the direction toward the user's left eye LE. The rear surface of the left eye lens LLS may have a convex shape, but the invention is not limited thereto. In an exemplary embodiment, the rear surface of the left eye lens LLS may have a concave shape or a planar shape, for example. As shown in FIG. 3, first to third left eye lights LDL1 to LDL3, which are lights emitted by the left eye display unit LD for each position, may pass through the left eye lens LLS, and may be refracted and provided to the user's left eye LE.

Similarly, the right eye lens RLS faces the right eye display unit RD, and magnifies an image RI (refer to FIG. 1B) for a right eye, displayed by the right eye display unit RD, and refracts the magnified image in the direction of the user's right eye RE. The front surface of the right eye lens RLS may have a convex shape toward the right eye display unit RD. However, the invention is not limited thereto, and the front surface of the right eye lens RLS may have a concave shape or a planar shape. Here, among both surfaces of the right eye lens RLS, the front surface of the right eye lens RLS may be one surface disposed in the direction toward the right eye display unit RD, and the rear surface of the right eye lens RLS may be one surface disposed in the direction toward the user's right eye RE. The rear surface of the right eye lens RLS may have a convex shape, but the invention is not limited thereto. In an exemplary embodiment, the rear surface of the right eye lens RLS may have a concave shape or a planar shape, for example. As shown in FIG. 3, first to third right eye lights RDL1 to RDL3, which are lights emitted by the right eye display unit RD for each position, may pass through the right eye lens RLS, and may be refracted and provided to the user's right eye RE.

A blocking unit (not shown) may be disposed between the left eye lens LLS and the right eye lens RLS. The blocking unit may be a part of the housing HA. The blocking unit may serve to prevent the image displayed on the left eye display unit LD from being recognized by the user's right eye RE and to prevent the image displayed on the right eye display unit RD from being recognized by the user's left eye LE.

The left eye lens LLS may be disposed so as to overlap the first left eye focus LF1 on a plane on which the left eye ellipse EL1 is disposed. In other words, the left eye lens LLS may be disposed such that at least a part of the section of the left eye lens LLS cut by the left eye ellipse EL1 overlaps the first left eye focus LF1. In this case, the phenomenon that the virtual image due to the reflected light of the left eye lens LLS is recognized by the user's left eye LE may be minimized. Similarly, the right eye lens RLS may be disposed so as to overlap the first right eye focus RF1 on a plane on which the right eye ellipse EL2 is disposed. In other words, the right eye lens RLS may be disposed such that at least a part of the section of the right eye lens RLS cut by the right eye ellipse EL2 overlaps the first right eye focus RF1. In this case, the phenomenon that the virtual image due to the reflected light of the right eye lens RLS is recognized by the user's right eye RE may be minimized.

The centroid LC of the left eye lens LLS may be disposed in the first sub left eye ellipse region LSR1. Here, the centroid LC of the left eye lens LLS corresponds to the geometric center of the section of the left eye lens LLS cut by the plane on which the left eye ellipse EL1 is disposed. The centroid LC of the left eye lens LLS may have coordinates of (Xlc, Ylc) on the coordinate plane assuming the center point of the left eye ellipse EL1 as the origin, the major axis Lax1 of the left eye ellipse as the x axis, and the minor axis of the left eye ellipse Lax2 as the y axis. The coordinates of the centroid LC of the left eye lens LLS may be calculated by Equations (5) and (6) below.

$$Xlc = \frac{1}{A}\int xdA \qquad \text{Equation (5)}$$

$$Ylc = \frac{1}{A}\int ydA \qquad \text{Equation (6)}$$

Here, A corresponds to the area of the section of the left eye lens LLS.

When the centroid LC of the left eye lens LLS is disposed in the first sub left eye ellipse region LSR1, the phenomenon that the virtual image due to the reflected light of the left eye lens LLS is recognized by the user's left eye LE may be minimized.

Similarly, the centroid RC of the right eye lens RLS may be disposed in the first sub right eye ellipse region RSR1. Here, the centroid RC of the right eye lens RLS corresponds to the geometric center of the section of the right eye lens RLS cut by the plane on which the right eye ellipse EL2 is disposed. The centroid RC of the right eye lens RLS may have coordinates of (Xrc, Yrc) on the coordinate plane assuming the center point of the right eye ellipse EL2 as the origin, the major axis Rax1 of the right eye ellipse as the x axis, and the minor axis of the right eye ellipse Rax2 as the y axis. The coordinates of the centroid RC of the right eye lens RLS may be calculated by Equations (7) and (8) below.

$$Xrc = \frac{1}{B}\int xdB \qquad \text{Equation (7)}$$

$$Yrc = \frac{1}{B}\int ydB \qquad \text{Equation (8)}$$

Here, B corresponds to the area of the section of the right eye lens RLS.

When the centroid RC of the right eye lens RLS is disposed in the first sub right eye ellipse region RSR1, the phenomenon that the virtual image due to the reflected light of the right eye lens RLS is recognized by the user's right eye RE may be minimized.

The section of the left eye lens LLS cut by the left eye ellipse EL1 may be disposed such that at least a part thereof overlaps the first sub left eye ellipse region LSR1. In this case, the phenomenon that the virtual image due to the reflected light of the left eye lens LLS is recognized by the user's left eye LE may be minimized. Similarly, the section of the right eye lens RLS cut by the right eye ellipse EL2 may be disposed such that at least a part thereof overlaps the first sub right eye ellipse region RSR1. In this case, the phenomenon that the virtual image due to the reflected light of the right eye lens RLS is recognized by the user's right eye RE may be minimized.

Figure 4:
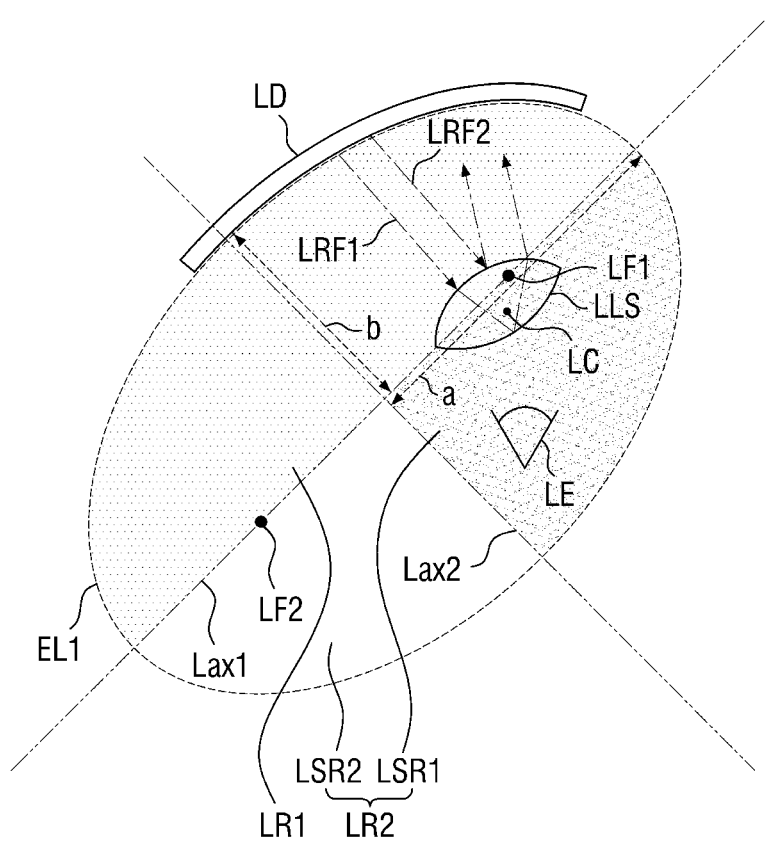
FIGS. 4 and 5 are sectional views showing an exemplary embodiment of a left eye display unit and a left eye lens according to the exemplary embodiment shown in FIGS. 2 and 3, respectively.
Figure 5:
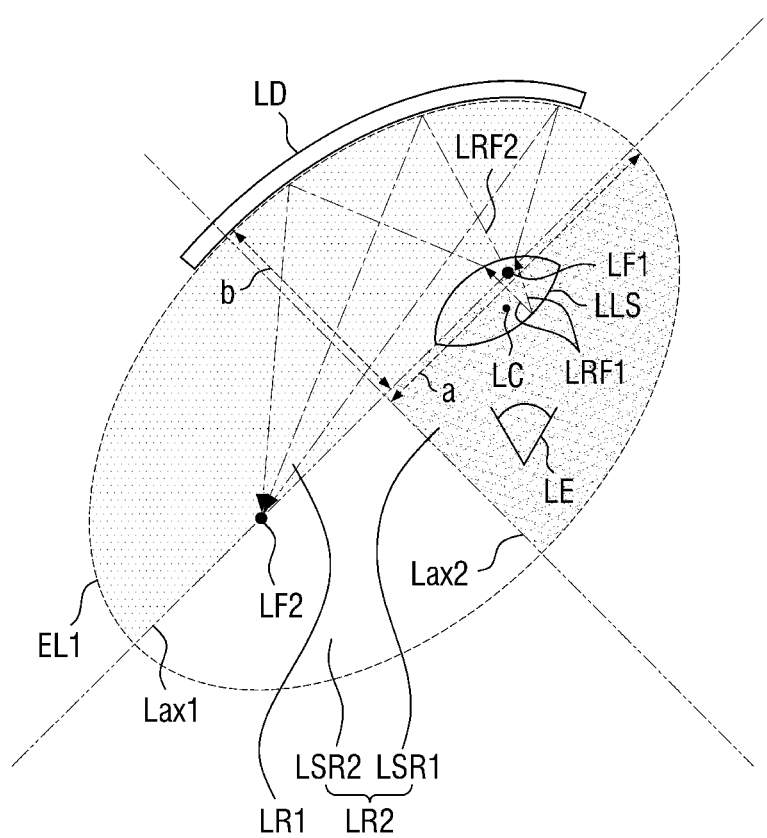

FIGS. 4 and 5 are further referred to for a more detailed description thereof.

FIGS. 4 and 5 are sectional views showing the left eye display unit and the left eye lens according to the exemplary embodiment shown in FIGS. 2 and 3.

FIG. 4 shows a path through which the light emitted from the left eye display unit LD is reflected from the front or rear surface of the left eye lens LLS, and FIG. 5 shows a path through which the light reflected from the front or rear surface of the left eye lens LLS is reflected by the left eye display unit LD and proceeds.

Referring to FIG. 4, the first left eye reflected light LRF1, which is a part of the light emitted from the left eye display part LD, may be reflected from the front surface of the left eye lens LLS and proceed toward the left eye display unit LD again. In this drawing, any one of the optical paths reflected from the front surface of the left eye lens LLS is exemplified as the optical path of the first left eye reflected light LRF1, but, in practice, light reflection may occur at various angles across all points on the front surface of the left eye lens LLS.

Further, although the second left eye reflected light LRF2, which is another part of the light emitted from the left eye display unit LD, is refracted at the front surface of the left eye lens LLS and normally proceeds, the second left eye reflected light LRF2 may be reflected from the rear surface of the left eye lens LLS and proceed toward the left eye display unit LD again. In this drawing, any one of the optical paths reflected from the rear surface of the left eye lens LLS is exemplified as the optical path of the second left eye reflected light LRF2, but, in practice, light reflection may occur at various angles across all points on the rear surface of the left eye lens LLS.

When the first left eye reflected light LRF1 and the second left eye reflected light LRF2 are reflected again by the left eye display unit LD and proceed to the left eye lens LLS again to reach the user's left eye LE, a blurred virtual image whose upper and lower and/or left and right are reflected may be recognized by the user. Such a virtual image may deteriorate display quality. However, since the light emitted from one focus of an ellipse has a property of being reflected by the ellipse and proceeding to the other focus of the ellipse, the deterioration of display quality due to the virtual image may be minimized when the structure of the invention is applied.

Specifically, as shown in FIG. 5, when the left eye lens LLS is disposed near the first left eye focus LF1 and the left eye display unit LD is disposed along the left eye ellipse EL1, the first left eye reflected light LRF1 and second left eye reflected light LRF2 reflected from the front or rear surface of the left eye lens LLS may be reflected again by the left eye display unit LD and then proceed toward the second left eye focus LF2. That is, the first left eye reflected light LRF1 and second left eye reflected light LRF2 reflected by the left eye lens LLS may not be provided to the user's left eye LE, and thus the user may not recognize the virtual image.

Here, the meaning that the left eye lens LLS is disposed near the left eye focus LF1 means that the left eye lens LLS is disposed to overlap the first left eye focus LF1 of the left lens LLS on the plane on which the left eye ellipse EL1 is disposed, the centroid LC of the left eye lens LLS is disposed in the first sub left eye ellipse region LSR1, or at least a part of the section of the left eye lens LLS cut by the left eye ellipse EL1 is disposed to overlap the first sub left eye ellipse region LSR1.

Since the description with reference to FIGS. 4 and 5 may be applied to the right eye display unit RD and the right eye lens RLS in the same manner, this description will be omitted.

Figure 6:
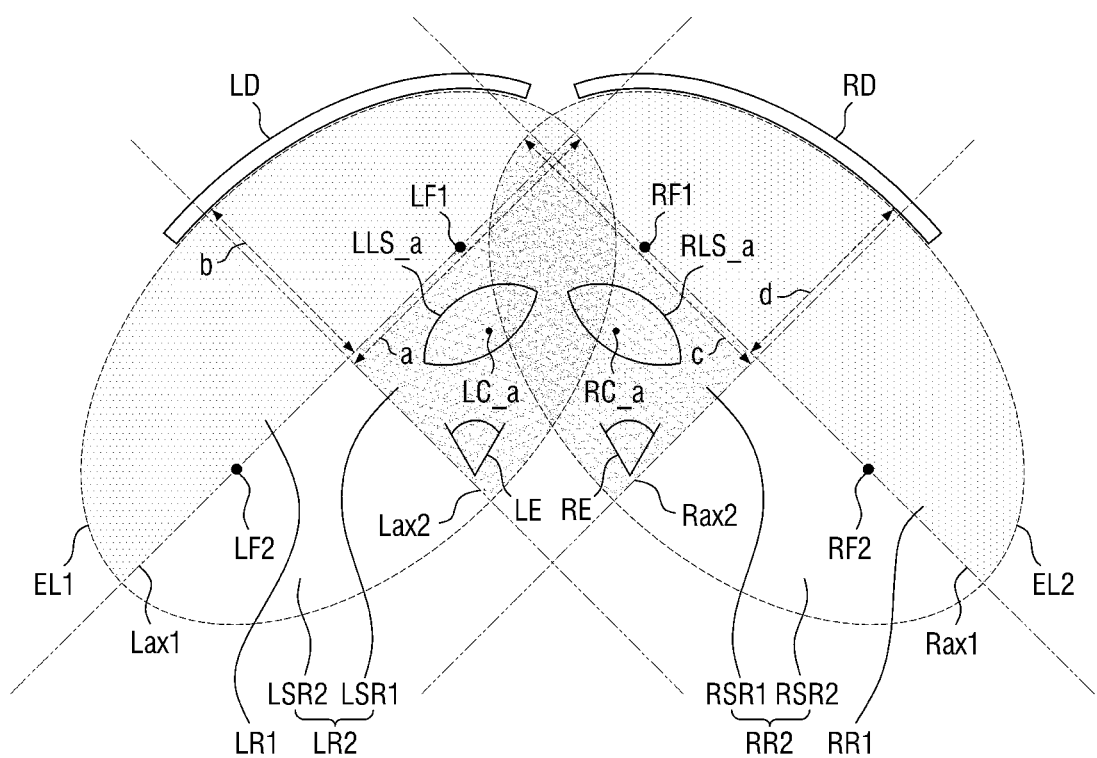
FIG. 6 is a sectional view of another exemplary embodiment of a head mounted display device at a point corresponding to the point of FIG. 3.

FIG. 6 is a sectional view of a head mounted display device according to another exemplary embodiment at a point corresponding to the point of FIG. 3.

In FIG. 6, a description of constituent elements and reference numerals which are the same as those described in FIGS. 1 to 5 will be omitted.

Referring to FIG. 6, the head mount display device according to this exemplary embodiment includes a left eye display unit LD, a right eye display unit RD, a left eye lens LLS_a, and a right eye lens RLS_a.

The left eye lens LLS_a may be disposed so as not to overlap the first left eye focus LF1, and the right eye lens RLS_a may be disposed so as not to overlap the first right eye focus RF1. However, the centroid LC_a of the left eye lens LLS_a may be disposed in the first sub left eye ellipse region LSR1, and the centroid RC_a of the right eye lens RLS_a may be disposed in the first sub right eye ellipse region RSR1. In the case of the exemplary embodiment described with reference to FIG. 3, the left eye lens LLS overlaps the first left eye focus LF1 and the centroid LC of the left eye lens LLS is disposed in the first sub left eye ellipse region LSR1, and the right eye lens RLS overlaps the first right eye focus RF1 and the centroid RC of the right eye lens RLS is disposed in the first sub right eye ellipse region RSR1. However, unlike the exemplary embodiment described with reference to FIG. 3, in the case of this exemplary embodiment, even when the left eye lens LLS_a and the right eye lens RLS_a do not necessarily overlap the first left eye focus LF1 and the first right eye focus RF1, respectively, when the centroid RC_a of the left eye lens LLS_a and the centroid RC_a of the right eye lens RLS_a are disposed in the first sub left eye ellipse region LSR1 and the first sub right eye ellipse region RSR1, respectively, the effect of the invention may be obtained.

Figure 7:
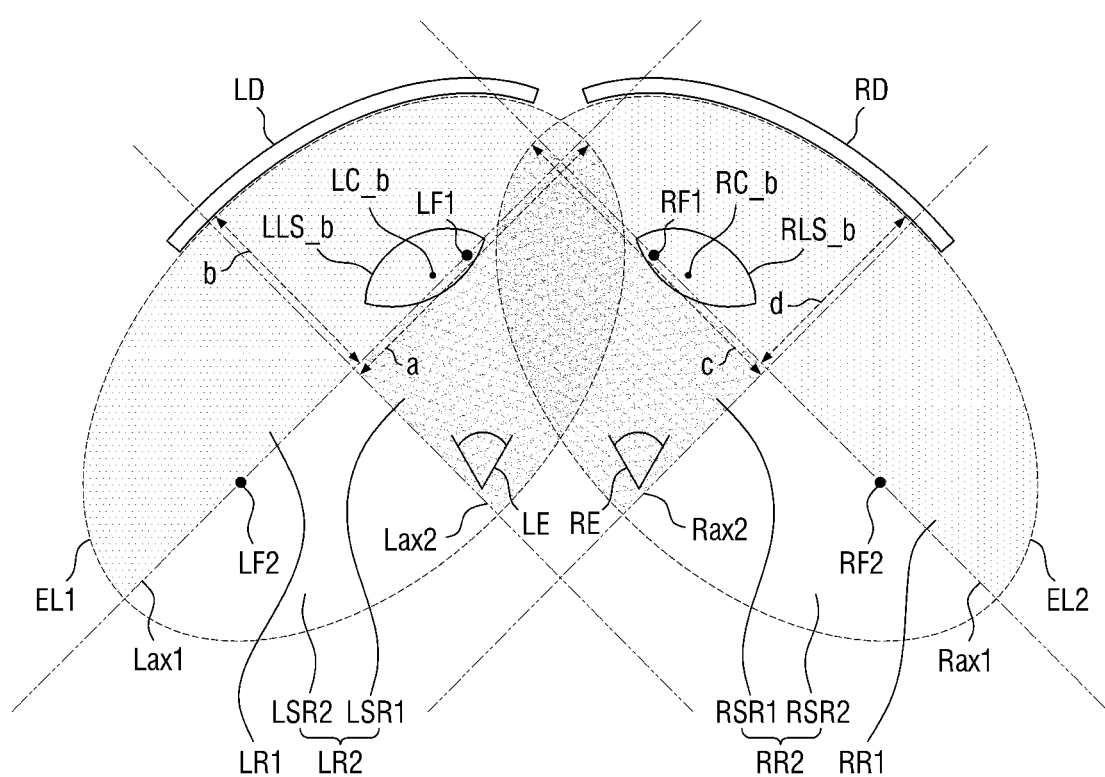
FIG. 7 is a sectional view of another exemplary embodiment of a head mounted display device at a point corresponding to the point of FIG. 3.

FIG. 7 is a sectional view of a head mounted display device according to another exemplary embodiment at a point corresponding to the point of FIG. 3.

In FIG. 7, a description of constituent elements and reference numerals which are the same as those described in FIGS. 1 to 5 will be omitted.

Referring to FIG. 7, the head mount display device according to this exemplary embodiment includes a left eye display unit LD, a right eye display unit RD, a left eye lens LLS_b, and a right eye lens RLS_b.

The centroid LC_b of the left eye lens LLS_b may be disposed in the first sub left eye ellipse region LSR1, and the centroid RC_b of the right eye lens RLS_b may be disposed in the first sub right eye ellipse region RSR1. However, the left eye lens LLS_b may be disposed so as to overlap the first left eye focus LF1, and the right eye lens RLS_b may be disposed so as to overlap the first right eye focus RF1.

In the case of the exemplary embodiment described with reference to FIG. 3, the left eye lens LLS overlaps the first left eye focus LF1 and the centroid LC of the left eye lens LLS is disposed in the first sub left eye ellipse region LSR1, and the right eye lens RLS overlaps the first right eye focus RF1 and the centroid RC of the right eye lens RLS is disposed in the first sub right eye ellipse region RSR1. However, unlike the exemplary embodiment described with reference to FIG. 3, in the case of this exemplary embodiment, even when the centroid LC_b of the left eye lens LLS_b and the centroid RC_b of the right eye lens RLS_b are not necessarily disposed in the first sub left eye ellipse region LSR1 and the first sub right eye ellipse region RSR1, respectively, when the left eye lens LLS_b and the right eye lens RLS_b overlap the first left eye focus LF1 and the first right eye focus RF1, respectively, the effect of the invention may be obtained.

Figure 8:
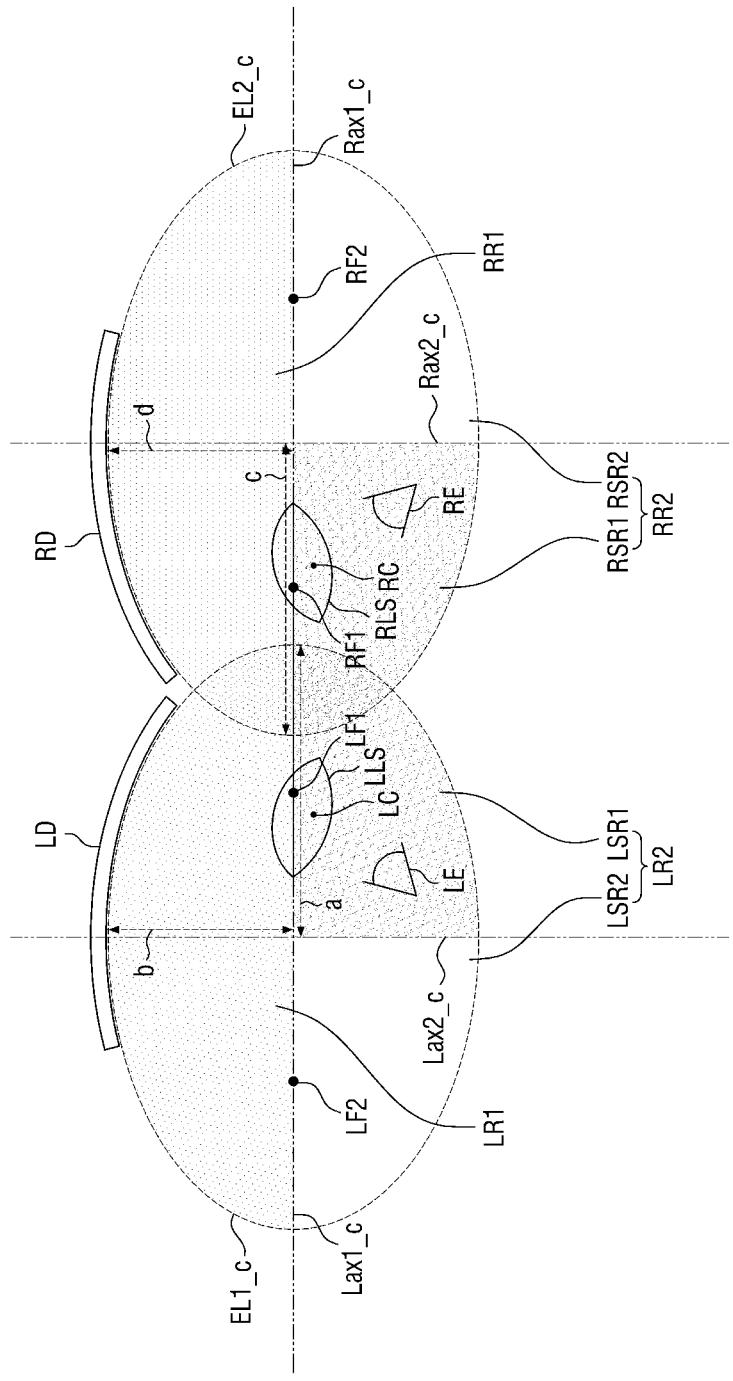
FIG. 8 is a sectional view of another exemplary embodiment of a head mounted display device at a point corresponding to the point of FIG. 3.

FIG. 8 is a sectional view of a head mounted display device according to another exemplary embodiment at a point corresponding to the point of FIG. 3.

In FIG. 8, a description of constituent elements and reference numerals which are the same as those described in FIGS. 1 to 5 will be omitted.

Referring to FIG. 8, the head mount display device according to this exemplary embodiment includes a left eye display unit LD, a right eye display unit RD, a left eye lens LLS, and a right eye lens RLS.

The left eye display unit LD may be disposed along the left eye ellipse EL1_c, and the right eye display unit RD may be disposed along the right eye ellipse EL2_c. Here, the major axis Lax1_c of the left eye ellipse EL1_c and the major axis Rax1_c of the right eye ellipse EL2_c may overlap each other. In other words, the major axis Lax1_c of the left eye ellipse EL1_c and the major axis Rax1_c of the right eye ellipse EL2_c may be disposed on the same line. Thus, the minor axis Lax2_c of the left eye ellipse EL1_c and the minor axis Rax2_c of the right eye ellipse EL2_c may be disposed in parallel to each other.

Figure 9:
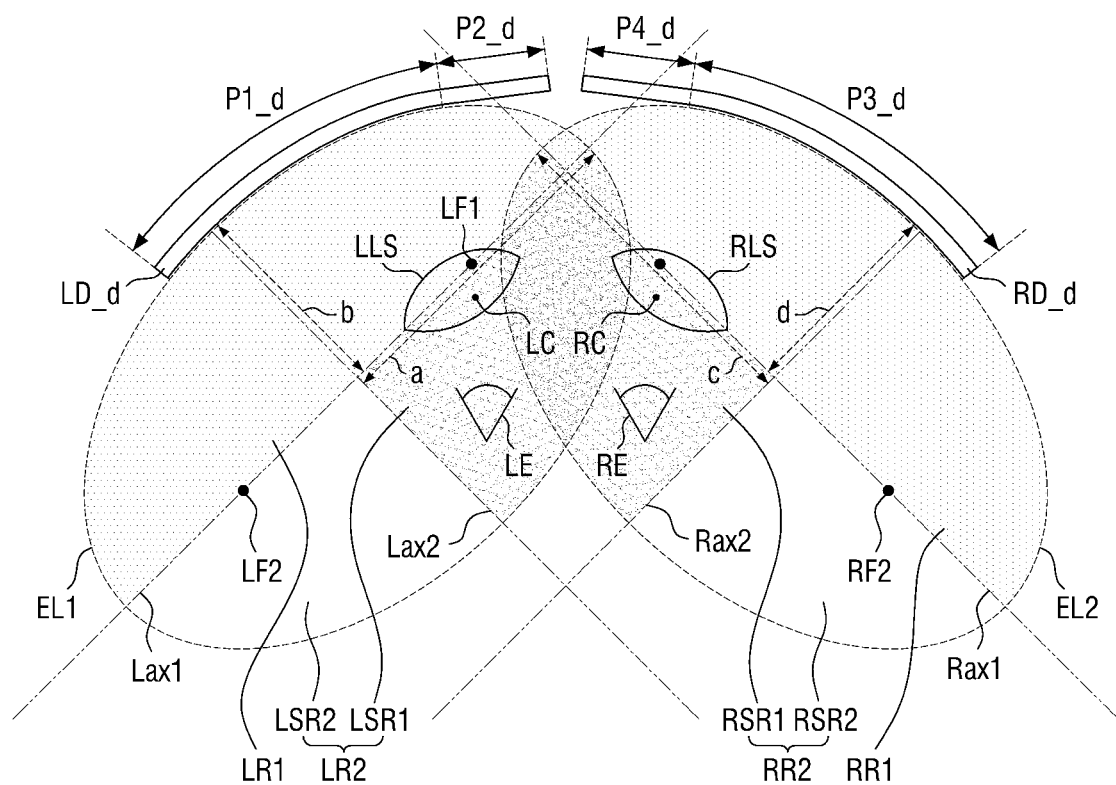
FIG. 9 is a sectional view of another exemplary embodiment of a head mounted display device at a point corresponding to the point of FIG. 3.

FIG. 9 is a sectional view of a head mounted display device according to another exemplary embodiment at a point corresponding to the point of FIG. 3.

In FIG. 9, a description of constituent elements and reference numerals which are the same as those described in FIGS. 1 to 5 will be omitted.

Referring to FIG. 9, the head mount display device according to this exemplary embodiment includes a left eye display unit LD_d, a right eye display unit RD_d, a left eye lens LLS, and a right eye lens RLS.

The left eye display unit LD_d includes a first portion P1_d disposed along the trajectory of the left eye ellipse EL1 having a major radius of a and a minor radius of b and a second portion P2_d extending in a straight line.

The second portion P2_d may be disposed to be connected to the first portion P1_d, and may extend along a straight line tangent to the contact point of the left eye ellipse EL1 disposed on the boundary between the first portion P1_d and the second portion P2_d.

The right eye display unit RD_d includes a third portion P3_d disposed along the trajectory of the right eye ellipse EL2 having a major radius of c and a minor radius of d and a fourth portion P4_d extending in a straight line.

The fourth portion P4_d may be disposed to be connected to the third portion P3_d, and may extend along a straight line tangent to the contact point of the right eye ellipse EL2 disposed on the boundary between the third portion P3_d and the fourth portion P4_d.

Further, the second portion P2_d of the left eye display unit LD_d may be disposed closer to the right eye display unit RD_d than the first portion P1_d of the left eye display unit LD_d, and the fourth portion P4_d of the right eye display unit RD_d may be disposed closer to the left eye display unit LD_d than the third portion P3_d of the right eye display unit RD_d. In other words, the left eye display unit LD_d and the right eye display unit RD_d may extend in a straight line between the left eye LE and right eye RE of a user. Thus, the distortion of an image in a region between the left eye and right eye LE and RE of the user may be minimized.

Figure 10:
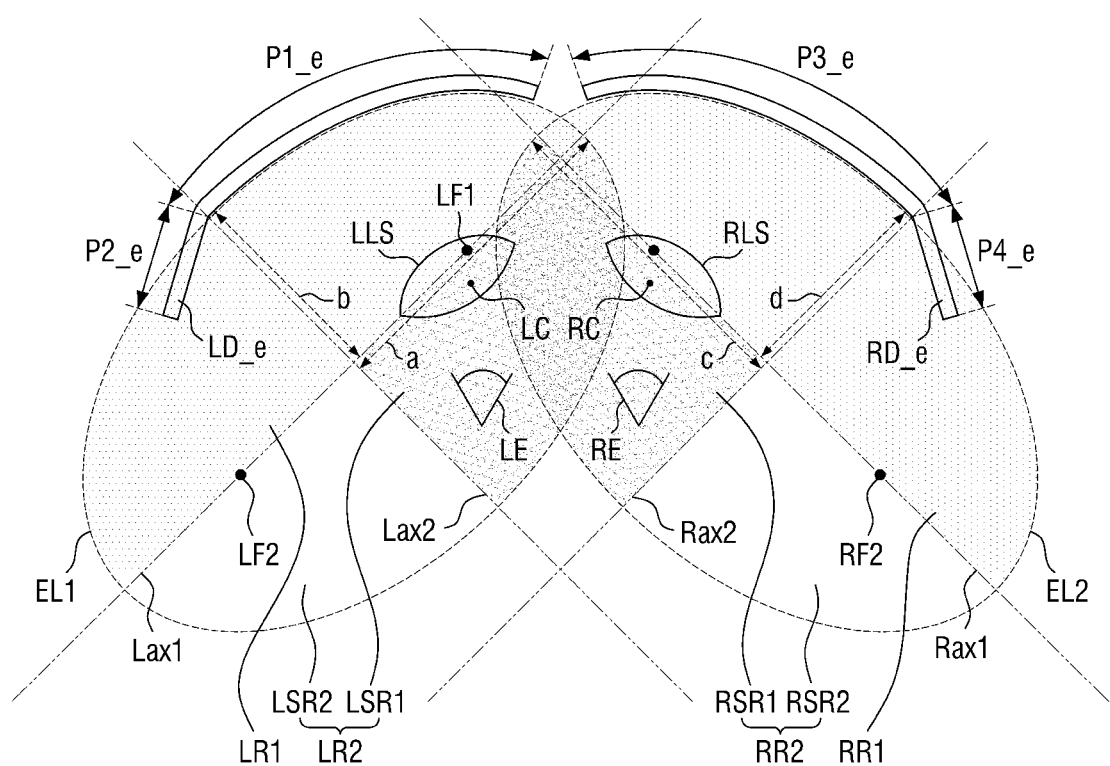
FIG. 10 is a sectional view of another exemplary embodiment of a head mounted display device at a point corresponding to the point of FIG. 3.

FIG. 10 is a sectional view of a head mounted display device according to another exemplary embodiment at a point corresponding to the point of FIG. 3.

In FIG. 10, a description of constituent elements and reference numerals which are the same as those described in FIGS. 1 to 5 will be omitted.

Referring to FIG. 10, the head mount display device according to this exemplary embodiment includes a left eye display unit LD_e, a right eye display unit RD_e, a left eye lens LLS, and a right eye lens RLS.

The left eye display unit LD_e includes a first portion P1_e disposed along the trajectory of the left eye ellipse EL1 having a major radius of a and a minor radius of b and a second portion P2_e extending in a straight line. The second portion P2_e may be disposed to be connected to the first portion P1_e, and may be disposed to overlap the inner region of the left eye ellipse EL1.

The right eye display unit RD_e includes a third portion P3_e disposed along the trajectory of the right eye ellipse EL2 having a major radius of c and a minor radius of d and a fourth portion P4_e extending in a straight line. The fourth portion P4_e may be disposed to be connected to the third portion P3_e, and may be disposed to overlap the inner region of the right eye ellipse EL2.

Further, the first portion P1_e of the left eye display unit LD_e may be disposed closer to the right eye display unit RD_e than the second portion P2_e of the left eye display unit LD_e, and the third portion P3_e of the right eye display unit RD_e may be disposed closer to the left eye display unit LD_e than the forth portion P4_e of the right eye display unit RD_e. In other words, in the left edge region of the user's left eye LE and the right edge region of the user's right eye RE, the left eye display unit LD_e and the right eye display unit RD_e may be formed to be bent into the left eye ellipse EL1 and the right eye ellipse EL2, respectively. Thus, the size of the head mount display device may be minimized.

Figure 11:
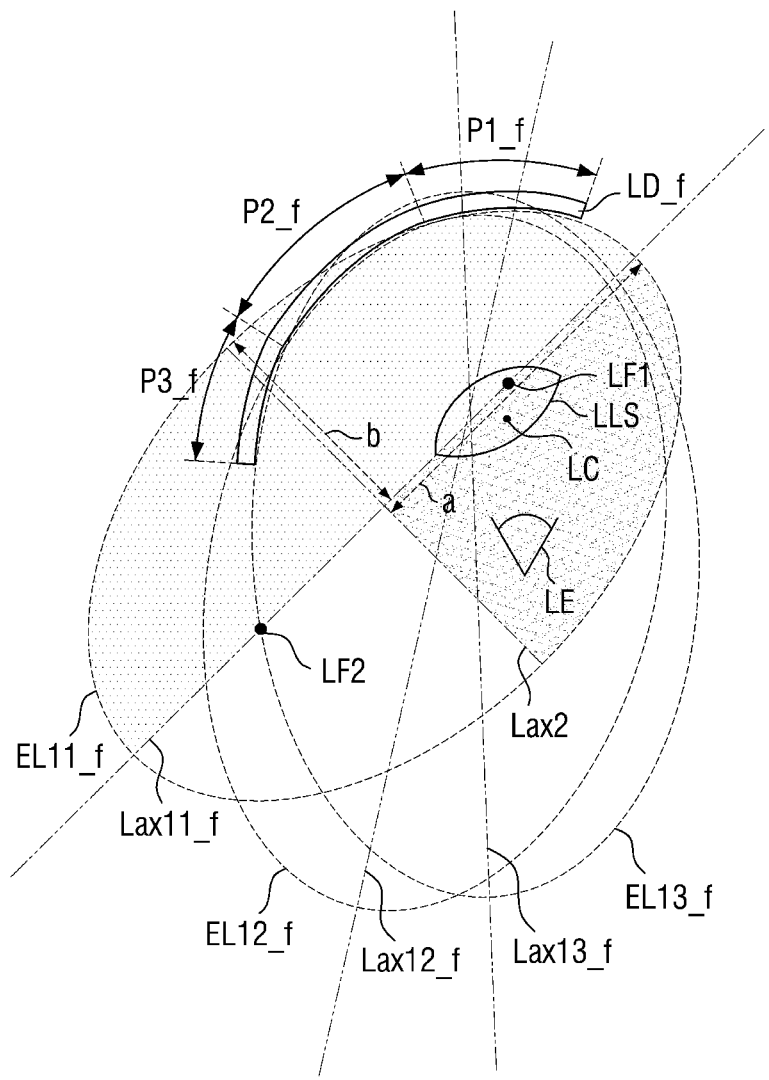
FIG. 11 is a sectional view of another exemplary embodiment of a head mounted display device at a point corresponding to the point of FIG. 4.

FIG. 11 is a sectional view of a head mounted display device according to another exemplary embodiment at a point corresponding to the point of FIG. 4.

In FIG. 11, a description of constituent elements and reference numerals which are the same as those described in FIGS. 1 to 5 will be omitted.

Referring to FIG. 11, the head mount display device according to this exemplary embodiment includes a left eye display unit LD_f and a left eye lens LLS. For the sake of convenience, a description of a right eye display unit and a right eye lens will be omitted, but the description of the left eye display unit LD_f and the left eye lens LLS may be similarly applied to the right eye display unit and the right eye lens.

The left eye display unit LD_f includes a first portion P1_f disposed along the trajectory of the first left eye ellipse EL11_f, a second portion P2_f disposed along the trajectory of the second left eye ellipse EL12_f, and a third portion P3_f disposed along the trajectory of the third left eye ellipse EL13_f.

The first to third portions P1_f to P3_f may be disposed so as to be connected adjacent to each other. The first to third left eye ellipses EL11_f to EL13_f may have major and minor radiuses of different values. In an exemplary embodiment, the first left eye ellipse El11_f has a major radius of a and a minor radius of b, and each of the second left eye ellipse EL12_f and the third left eye ellipse EL13_f may have a major radius of a value other than a and a minor axis of a value other than b, for example. Moreover, the major axis Lax11_f of the first left eye ellipse, the major axis Lax12_f of the second left eye ellipse, and the major axis Lax13_f of the third left eye ellipse may intersect each other. That is, as described in this exemplary embodiment, the left eye display unit LD_f may be disposed along a plurality of different elliptical trajectories.

Figure 12:
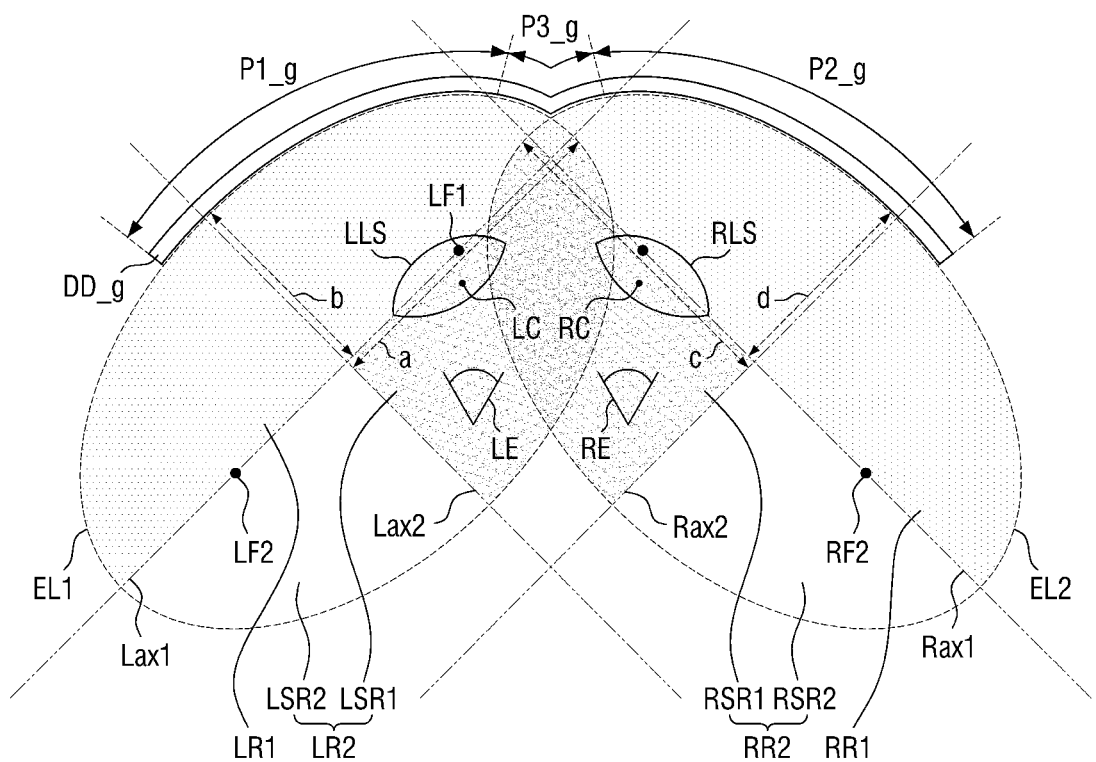
FIG. 12 is a sectional view of another exemplary embodiment of a head mounted display device at a point corresponding to the point of FIG. 3.

FIG. 12 is a sectional view of a head mounted display device according to another exemplary embodiment at a point corresponding to the point of FIG. 3.

In FIG. 12, a description of constituent elements and reference numerals which are the same as those described in FIGS. 1 to 5 will be omitted.

Referring to FIG. 12, the head mount display device according to this exemplary embodiment includes a display unit DD_g, a left eye lens LLS, and a right eye lens RLS.

The display unit DD_g includes first to third portions P1_g to P3_g. The display unit DD_g may be composed of one panel in which a portion in contact with the left eye ellipse EL1 and a portion in contact with the right eye ellipse EL2 are integrated with each other.

Specifically, the first portion P1_g may extend along the trajectory of the left eye ellipse EL1 and may display an image. The second portion P2_g may extend along the trajectory of the right eye ellipse EL2 and may display an image. The third portion P3_g may be a portion that does not display an image between the left eye LE and right eye LE and RE of the user. In other words, the pixel may not be disposed in the third portion P3_g. As such, images may be provided to both the left and right eyes LE and RE of the user through one panel.

Figure 13:
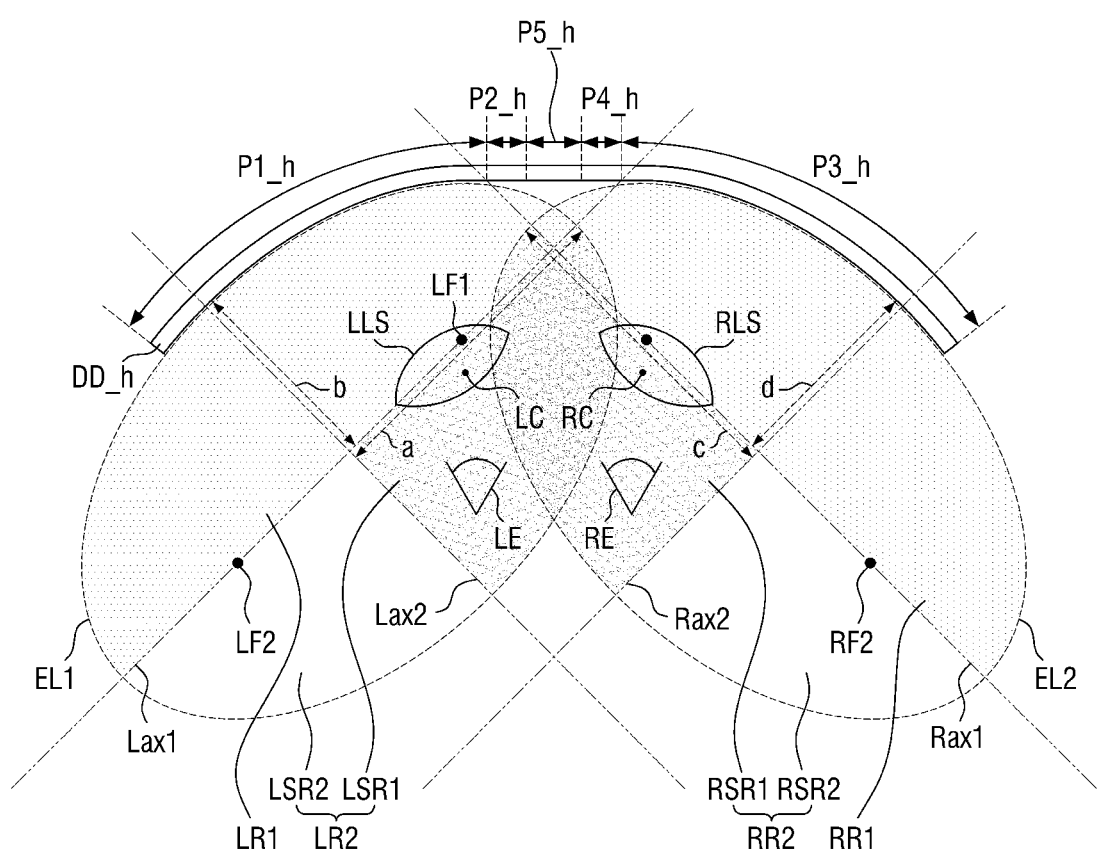
FIG. 13 is a sectional view of another exemplary embodiment of a head mounted display device at a point corresponding to the point of FIG. 3.

FIG. 13 is a sectional view of a head mounted display device according to another exemplary embodiment at a point corresponding to the point of FIG. 3.

In FIG. 13, a description of constituent elements and reference numerals which are the same as those described in FIGS. 1 to 5 will be omitted.

Referring to FIG. 13, the head mount display device according to this exemplary embodiment includes a display unit DD_h, a left eye lens LLS, and a right eye lens RLS.

The display unit DD_h includes first to fifth portions P1_h to P5_h. The display unit DD_h may be composed of one panel in which a portion in contact with the left eye ellipse EL1 and a portion in contact with the right eye ellipse EL2 are integrated with each other.

Specifically, the first portion P1_h may extend along the trajectory of the left eye ellipse EL1 and may display an image. The third portion P3_h may extend along the trajectory of the right eye ellipse EL2 and may display an image. The fifth portion P5_h may be a portion that does not display an image between the left eye LE and right eye LE and RE of the user. In other words, the pixel may not be disposed in the fifth portion P5_h. The second portion P2_h is disposed between the first portion P1_h and the fifth portion P5_h, extends in a straight line, and displays an image. The fourth portion P4_h is disposed between the third portion P3_h and the fifth portion P5_h, extends in a straight line, and displays an image.

As such, images may be provided to both the left and right eyes LE and RE of the user through one panel, and a part of the display unit DD_h extends in a straight line, so as to minimize the distortion of an image.

Figure 14:
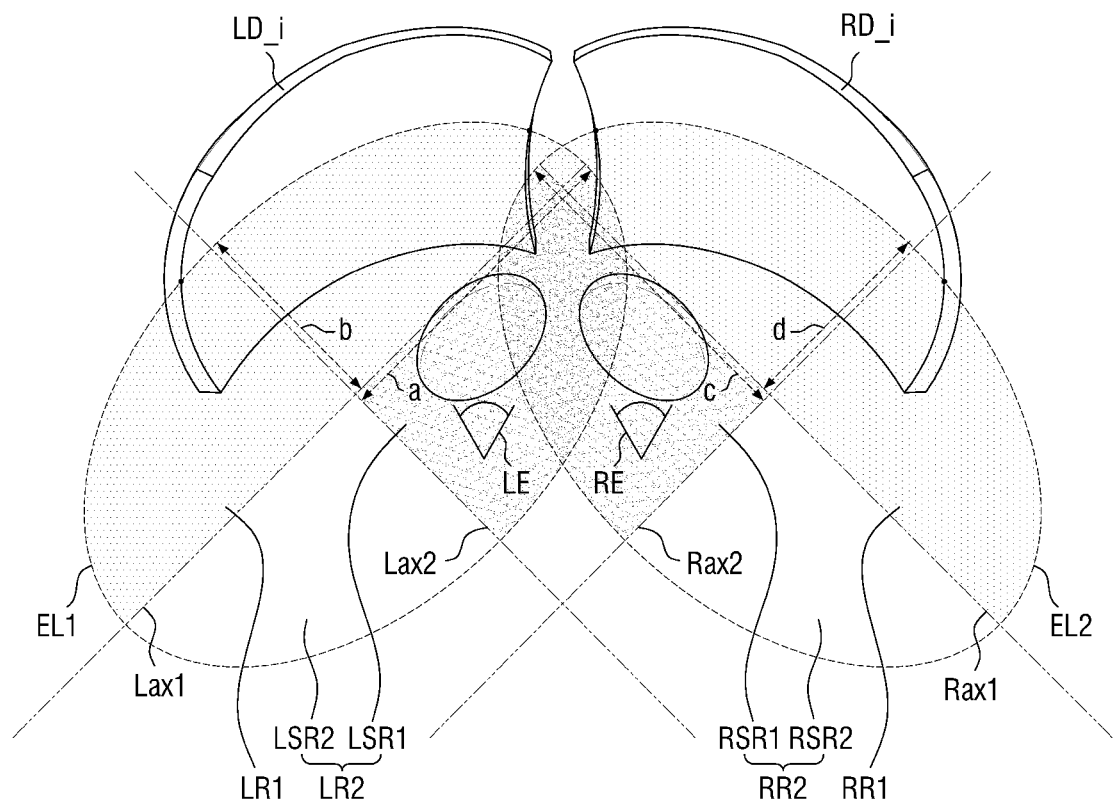
FIG. 14 is a sectional view of another exemplary embodiment of a head mounted display device at a point corresponding to the point of FIG. 2.

FIG. 14 is a sectional view of a head mounted display device according to another exemplary embodiment at a point corresponding to the point of FIG. 2.

In FIG. 14, a description of constituent elements and reference numerals which are the same as those described in FIGS. 1 to 5 will be omitted.

Referring to FIG. 14, the head mount display device according to this exemplary embodiment includes a left eye display unit LD_i, a right eye display unit RD_i, a left eye lens LLS, and a right eye lens RLS.

The left eye display unit LD_i may have a shape curved along the trajectory of the left eye ellipse EL1 and curved along a direction perpendicular to a plane on which the left eye ellipse EL1 is disposed. More specifically, the left eye display unit LD_i may have a shape curved along the surface of an ellipsoid including the left eye ellipse EL1.

Similarly, the right eye display unit RD_i may have a shape curved along the trajectory of the right eye ellipse EL2 and curved along a direction perpendicular to a plane on which the right eye ellipse EL2 is disposed. More specifically, the right eye display unit RD_i may have a shape curved along the surface of an ellipsoid including the right eye ellipse EL2.

Figure 15:
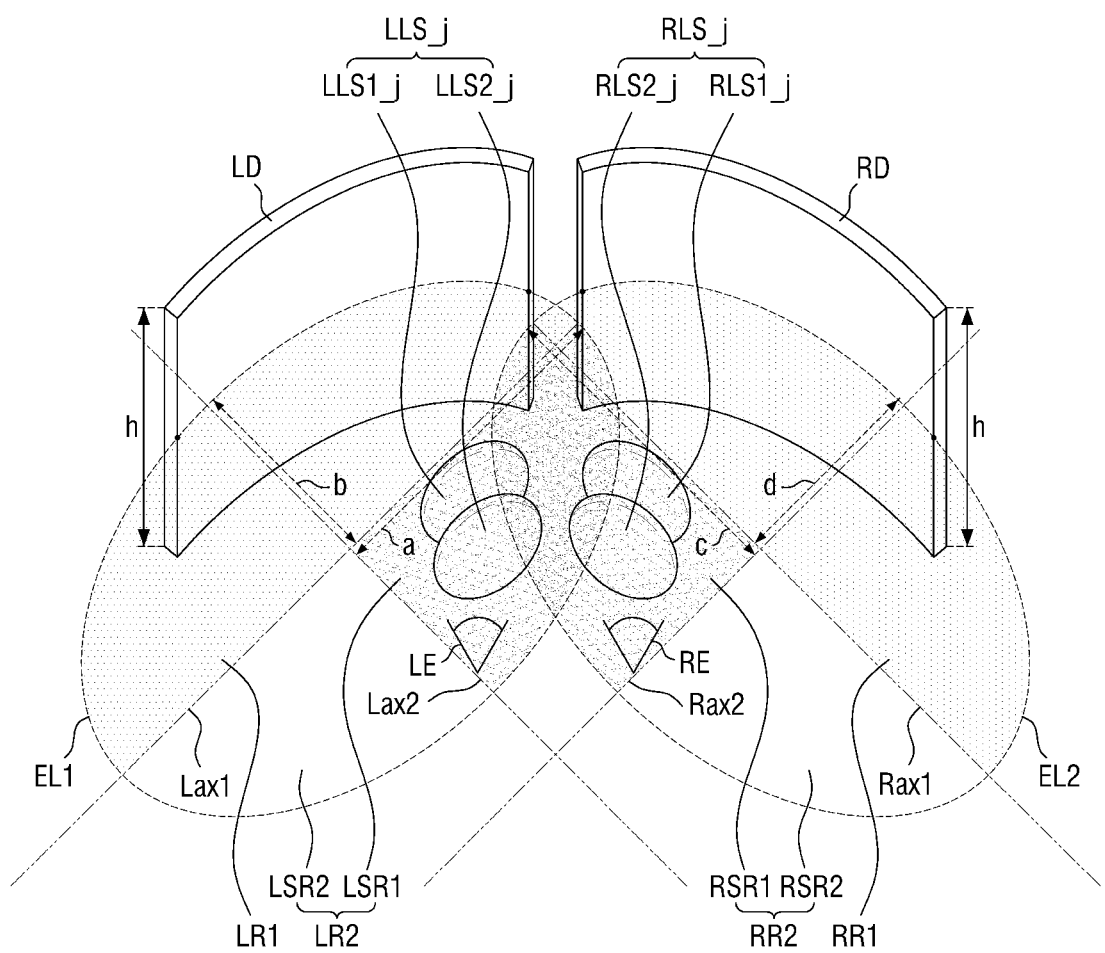
FIG. 15 is a schematic view of another exemplary embodiment of a head mounted display device at a point corresponding to the point of FIG. 2.
Figure 16:
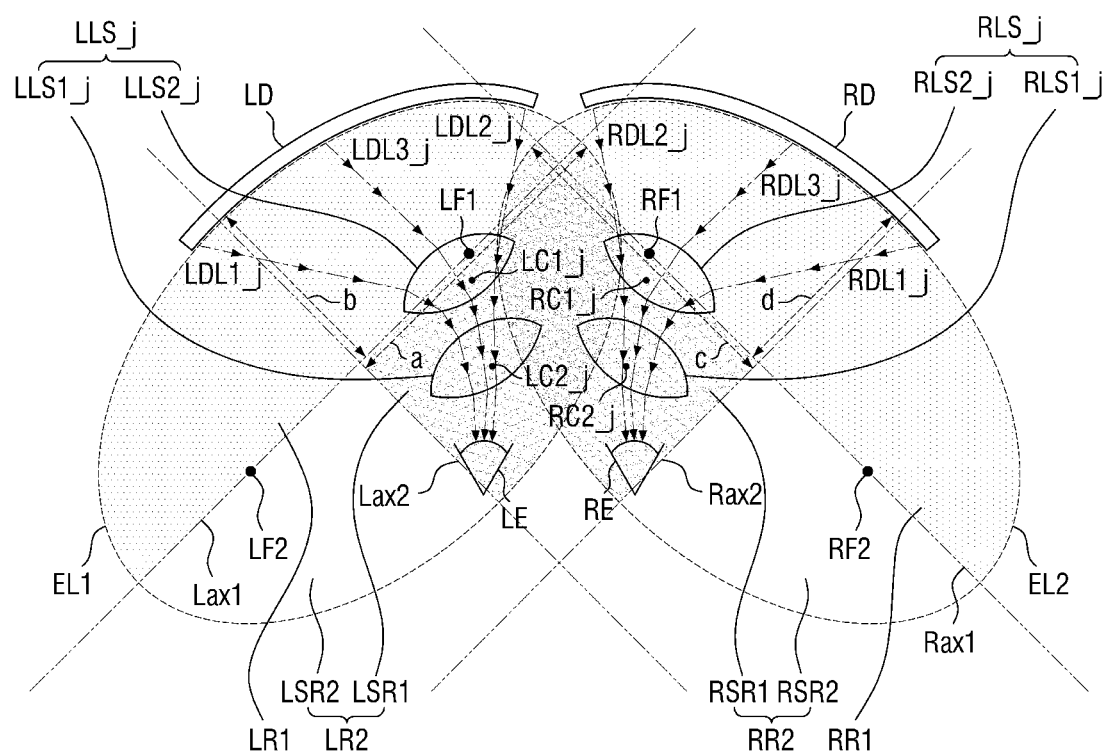
FIG. 16 is a sectional view of the head mounted display device shown in FIG. 15 taken along the plane on which a left eye ellipse and a right eye ellipse are disposed.

FIG. 15 is a schematic view of a head mounted display device according to another exemplary embodiment at a point corresponding to the point of FIG. 2, and FIG. 16 is a sectional view of the head mounted display device shown in FIG. 15 taken along a plane on which a left eye ellipse and a right eye ellipse are disposed.

In FIGS. 15 and 16, a description of constituent elements and reference numerals which are the same as those described in FIGS. 1 to 5 will be omitted.

Referring to FIGS. 15 and 16, the head mount display device according to this exemplary embodiment includes a left eye display unit LD, a right eye display unit RD, a left eye lens unit LLS_j, and a right eye lens unit RLS_j.

The left lens unit LLS_j includes a first left eye lens LLS1_j and a second left eye lens LLS2_j. The first left eye lens LLS1_j and the second left eye lens LLS2_j may serve to refract an image provided from the left eye display unit LD and provide the refracted image to the user's left eye LE. That is, the first left eye lens unit LLS1_j may allow the image provided from the left eye display unit LD to be provided to the user's left eye LE along first to third left optical paths LDL1_j to LDL3_j.

When at least one of the first left eye lens LLS1_j and a second left eye lens LLS2_j is disposed near the first left eye focus LF1 and the left eye display unit LD is disposed along the left eye ellipse EL1, the virtual image recognized by the user may be minimized.

Here, the meaning that at least one of the first left eye lens LLS1_j and the second left eye lens LLS2_j is disposed near the first left eye focus LF1 may mean that at least one of the first left eye lens LLS1_j and a second left eye lens LLS2_j is disposed to overlap the first left eye focus LF1 on the plane on which the left eye ellipse EL1 is disposed, at least one of the centroid LC1_j of the first left eye lens LLS_j and the centroid LC2_j of the second left eye lens LLS2_j is disposed in the first sub left eye ellipse region LSR1, or at least a part of at least one of the two sections of the first left eye lens LLS1_j and the second left eye lens LLS2_j cut by the left eye ellipse EL1 is disposed to overlap the first sub left eye ellipse region LSR1.

The description of the left eye lens unit LLS_j of this exemplary embodiment may be similarly applied to the right eye lens unit RLS_j. That is, the right eye lens unit RLS_j includes a first right eye lens RLS1_j and a second right eye lens RLS2_j. The first right eye lens RLS1_j and the second right eye lens RLS2_j may serve to refract an image provided from the right eye display unit RD and provide the refracted image to the user's right eye RE. That is, the right left eye lens unit RLS1_j may allow the image provided from the right eye display unit RD to be provided to the user's right eye RE along first to third left optical paths RDL1_j to RDL3_j. Further, the virtual image recognized by the user may be minimized according to the disposition of the right eye lens unit RLS_j.

In this exemplary embodiment, the structure in which each of the left eye lens unit LLS_j and the right eye lens unit RLS_j includes two lenses has been described, but the invention is not limited thereto. That is, in some exemplary embodiments, each of the left eye lens unit and the right eye lens unit may have a structure including three or more lenses.

As described above, according to embodiments of the invention, it is possible to provide a head mounted display device, which may minimize the phenomenon of a virtual image caused by the reflected light due to a lens being recognized to a user.

The effects of the invention are not limited by the foregoing, and other various effects are anticipated herein.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A head mounted display device, comprising:
a display unit including a first portion which displays an image for a left eye and is disposed along a trajectory of a left eye ellipse having a first eccentricity, a second portion which displays an image for a right eye and is disposed along a trajectory of a right eye ellipse having a second eccentricity, and a third portion between the first portion and the second portion;
a left eye lens which faces the first portion and refracts the image for the left eye in a direction of a user's left eye; and
a right eye lens which faces the second portion and refracts the image for the right eye in a direction of a user's right eye,
wherein the left eye ellipse and the right eye ellipse partially overlap each other.

2. The head mounted display device of claim 1,
wherein the left eye ellipse is divided by a major axis of the left eye ellipse, and includes a first left eye ellipse region adjacent to the display unit and a second left eye ellipse region spaced apart from the display unit,
the second left eye ellipse region is divided by a minor axis of the left eye ellipse, and includes a first sub left eye ellipse region disposed near the display unit and a second sub left eye ellipse region disposed away from the display unit, and
the left eye lens has a centroid disposed in the first sub left eye ellipse region.

3. The head mounted display device of claim 1,
wherein the left eye ellipse is divided by a major axis of the left eye ellipse, and includes a first left eye ellipse region adjacent to the display unit and a second left eye ellipse region spaced apart from the display unit,
the second left eye ellipse region is divided by a minor axis of the left eye ellipse, and includes a first sub left eye ellipse region disposed near the display unit and a second sub left eye ellipse region disposed away from the display unit, and
at least a part of the left eye lens overlaps the first sub left eye ellipse region on a plane on which the left eye ellipse is disposed.

4. The head mounted display device of claim 1,
wherein the first eccentricity and the second eccentricity have the same value.

5. The head mounted display device of claim 1,
wherein the third portion does not display the image for the left eye and the image for the right eye.

6. The head mounted display device of claim 1,
wherein the left eye display unit is disposed to be spaced apart from the major axis of the left eye ellipse.

7. A head mounted display device, comprising:
a display unit including a first portion which displays an image for a left eye and is disposed along a trajectory of a left eye ellipse having a first eccentricity, a second portion which displays an image for a right eye and is disposed along a trajectory of a right eye ellipse having a second eccentricity, and a third portion between the first portion and the second portion;
a left eye lens which faces the first portion and refracts the image for the left eye in a direction of a user's left eye; and
a right eye lens which faces the second portion and refracts the image for the right eye in a direction of a user's right eye,
wherein the left eye ellipse defines a fist left eye focus and a second left eye focus, and
the left eye lens overlaps at least one of the first left eye focus and the second left eye focus on a plane on which the left eye ellipse is disposed.

8. The head mounted display device of claim 7,
wherein the first left eye focus is disposed closer to a user's right eye than the second left eye focus, and
the left eye lens overlaps the first left eye focus on the plane on which the left eye ellipse is disposed.

9. The head mounted display device of claim 7,
wherein the left eye ellipse is divided by a major axis of the left eye ellipse, and
wherein the first left eye focus and the second left eye focus are on the major axis of the left eye ellipse.

10. A head mounted display device, comprising:
a display unit including a first portion which displays an image for a left eye and is disposed along a trajectory of a left eye ellipse having a first eccentricity, a second portion which displays an image for a right eye and is disposed along a trajectory of a right eye ellipse having a second eccentricity, and a third portion between the first portion and the second portion;
a left eye lens which faces the first portion and refracts the image for the left eye in a direction of a user's left eye; and
a right eye lens which faces the second portion and refracts the image for the right eye in a direction of a user's right eye,
wherein the major axis of the left eye ellipse and the major axis of the right eye ellipse intersect each other.

* * * * *